United States Patent [19]

Hirota et al.

[11] Patent Number: 5,731,044

[45] Date of Patent: Mar. 24, 1998

[54] PROCESS AND APPARATUS FOR COATING DISPLAY CRT TUBE FOR ELECTRONIC DEVICE

[75] Inventors: Kashichi Hirota; Aijiro Okuzumi; Yoshiaki Masumura, all of Hachioji, Japan

[73] Assignee: Kyowa Electric & Chemical Co., Ltd., Tokyo, Japan

[21] Appl. No.: 664,766

[22] Filed: Jun. 18, 1996

[30] Foreign Application Priority Data

Jun. 19, 1995 [JP] Japan ............... 7-151417
Sep. 5, 1995 [JP] Japan ............... 7-228254
Sep. 19, 1995 [JP] Japan ............... 7-239928

[51] Int. Cl.[6] ............... B05D 5/06
[52] U.S. Cl. ............... 427/512; 427/64; 427/72; 427/165; 427/420; 427/422; 427/425; 427/508; 427/553; 427/558; 427/559
[58] Field of Search ............... 427/64, 72, 165, 427/512, 508, 558, 559, 553, 420, 422, 425

[56] References Cited

U.S. PATENT DOCUMENTS

| | | | |
|---|---|---|---|
| 3,526,535 | 9/1970 | Plumat | 427/420 |
| 3,876,465 | 4/1975 | Prazak, III | 427/64 |
| 3,984,902 | 10/1976 | Prazak, III | 427/420 |
| 5,449,534 | 9/1995 | Oishi et al. | 427/64 |

FOREIGN PATENT DOCUMENTS

| | | |
|---|---|---|
| 43-10183 | 5/1968 | Japan . |
| 45-4431 | 2/1970 | Japan . |
| 53-29063 | 2/1978 | Japan . |

*Primary Examiner*—Katherine A. Bareford
*Attorney, Agent, or Firm*—Frishauf, Holtz, Goodman, Langer & Chick, P.C.

[57] ABSTRACT

A process for coating a front surface of a cathode ray, the process being characterized by using a ultraviolet ray setting plastic material as a coating material. According to the process, a preformed cathode ray tube bulb having a front surface is maintained with the front surface directed upwards and a transparent, fluidized or molten plastic material of ultraviolet setting property is discharged to the front surface of the bulb through a plurality of thin nozzles arranged in at least one row or one or more nozzles each having an elongated nozzle opening. In this instance, it is preferable that the molten plastic material discharged from the nozzles is received by a film forming surface which is arranged adjacent to the nozzles to form a thin plastic film before it reaches the front surface of the bulb. Preferably, the film forming surface is provided by a sheet of a material, such as a silicon rubber, which is not wettable to the plastic material. The plastic material received by the film forming surface is permitted to flow downwards forming a thin substantially uniform film. The cathode ray tube bulb is moved beneath the film forming surface with the front surface directed upwards. Thus, the front surface of the bulb is coated with a thin film of the plastic material. During the process of forming the coating layer or immediately after the process, ultraviolet ray is applied to the coating layer to set or solidify the plastic material in the layer.

13 Claims, 8 Drawing Sheets

FIG. 12b

PROCESS AND APPARATUS FOR COATING DISPLAY CRT TUBE FOR ELECTRONIC DEVICE

FIELD OF THE INVENTION

The present invention relates to a manufacture of cathode ray display tube for electronic devices such as television receivers, computers and the like. More particularly, the present invention pertains to a process and apparatus for forming a coating of plastic material on a surface of a cathode ray display tube.

DESCRIPTION OF THE PRIOR ART

It has been recognized in the field of electronic devices such as television receivers, computers and the like which use cathode ray tube that explosions can be produced in the cathode ray tube when it gets damages or scratches on the surface of the glass bulb. Conventionally, in order to avoid such danger of explosion, it has been a common practice to provide a relatively thick protective glass plate on the front surface of the glass bulb of the cathode ray tube.

It should however be noted that the conventional structure is disadvantageous in that the resultant weight of the cathode ray tube is inevitably increased because of the relatively thick protective glass plate. The protective glass plate must be shaped in advance so that it can be fitted to the front surface of the cathode ray tube. Therefore, a time consuming work is required for shaping the protective glass plate prior to attaching it to the bulb.

Hithertofore, in order to solve the problems, it has been proposed by, for example, the Japanese utility model publication No. Sho 43-10183 and the Japanese patent publication No. Sho 45-4431 to apply a thin film or sheet of a plastic material to the front surface of the cathode ray tube. The Japanese utility model publication No. Sho 43-10183 teaches to attach a plastic film to a frame member which is then mounted on a cathode ray tube by means of a mounting frame. Thus, the frame and the mounting frame are left on the final product. In contrast, the Japanese patent publication No. Sho 45-4431 proposes to adhesively apply a thin sheet of a plastic material to the front surface of the tube. There is taught to apply a vacuum or suction pressure when the sheet is being applied to the tube surface. It should however be noted that it is extremely difficult to avoid possibility of air being entrapped in the adhesive. Thus, the prior proposals cannot provide satisfactory final products.

The Japanese laid-open patent application No. Sho 53-29063 discloses a method for providing a plastic coating layer on the front surface of a cathode ray tube by means of a plastic coating technology. In the process disclosed by the application, a plurality of coating material supply tubes are provided with the discharge openings directed downwards and a cathode ray tube is placed beneath the supply tubes with the front surface directed upwards. The plastic material is discharged in a molten state to the front surface of the cathode ray tube to thereby form a coating layer of the plastic material.

It has been recognized that the process can provide a plastic coating layer substantially free from air entrapped in the layer through an appropriate adjustment of the discharge rate of the plastic material from the supply tubes with respect to the relative speed between the supply tubes and the cathode ray tube. It has however been found that in the process it is difficult or require a highly experienced skill to provide a substantially uniform coating layer on the tube front surface since the plastic material is discharged through the plurality of supply tubes in a fluidized state. The problem cannot be solved even when nozzles of very fine diameters are used since it is difficult to form a thin uniform film of the plastic material before it reaches the front surface of the cathode ray tube.

DISCLOSURE OF THE INVENTION

The present invention is aimed to solve the aforementioned problems and has an object to provide a process and an apparatus for forming the front surface of a cathode ray tube with a plastic protective layer of a substantially uniform thickness through a utilization of a plastic coating technology.

According to one aspect of the present invention, the above and other objects can be accomplished by a process for coating a front surface of a cathode ray, the process being characterized by using a ultraviolet ray setting plastic material as a coating material. According to the process, a preformed cathode ray tube bulb having a front surface is maintained with the front surface directed upwards and a transparent, fluidized or molten plastic material of ultraviolet setting property is discharged to the front surface of the bulb through a plurality of thin nozzles arranged in at least one row or one or more nozzles each having an elongated nozzle opening. In this instance, it is preferable that the molten plastic material discharged from the nozzles is received by a film forming surface which is arranged adjacent to the nozzles to form a thin plastic film before it reaches the front surface of the bulb. Preferably, the film forming surface is provided by a sheet of a material, such as a silicon rubber, which is not wettable to the plastic material. The plastic material received by the film forming surface is permitted to flow downwards forming a thin substantially uniform film. The cathode ray tube bulb is moved beneath the film forming surface with the front surface directed upwards. Thus, the front surface of the bulb is coated with a thin film of the plastic material. During the process of forming the coating layer or immediately after the process, ultraviolet ray is applied to the coating layer to set or solidify the plastic material in the layer.

According to another aspect of the present invention, there is provided a process for coating the front surface of a cathode ray tube bulb which can effectively prevent a dripping of molten plastic material from the nozzle opening at the end of the coating process. The process comprises steps of filling a closed space with molten or fluidized ultraviolet ray setting transparent plastic material, discharging the plastic material from the closed space through a plurality of thin nozzles or one or more nozzles each having an elongated discharged opening to the front surface of the bulb to thereby form a coating layer of the transparent plastic material throughout the front surface of the bulb while supplying the plastic material to the closed space from a supply source of the plastic material through a valve, stopping the supply of the plastic material by closing the valve at the end of the coating step and applying a suction to the closed space through a suction passage connected with the closed space to draw at least a part of the plastic material remaining the nozzles. It is also preferable in this process to receive the molten plastic material discharged through the nozzles by a film forming surface to form a thin uniform film.

The ultraviolet ray setting plastic material may be an urethane-acrylate resin, polyester resin or epoxy resin. It is preferable in setting or solidifying the plastic material to alternately incline the front surface of the bulb in opposite directions or rotate the bulb about an axis which is inclined with respect to a vertical direction. Alternatively, the plastic material may be set or solidified while the coating layer is being subjected to a blow of air curtain. The process is found to be effective to maintain the plastic coating layer in a uniform thickness during the setting or solidifying step.

According to the present invention, there is also provided an apparatus for coating the front surface of a cathode ray tube bulb. The apparatus comprises a nozzle device including a plurality of nozzles each having a nozzle opening and arranged in at least one row or at least one nozzle having an elongated discharge nozzle opening, at least one film forming surface located adjacent to the nozzle device and extending downwards from the nozzle opening, a source of material for providing a supply of molten plastic material to the nozzle device, and a bulb support device adapted for supporting a cathode ray tube bulb with the front surface of the bulb maintained at a predetermined distance from the lower end of the film forming surface and moving the bulb with respect to the film forming surface in a direction transverse to the lower end of the film forming surface.

It is preferable that the film forming surface is provided by a material such as silicon rubber which is not wettable to the molten plastics. More preferably, the film forming surface is provided by a sheet member such as a silicon rubber sheet.

In the aforementioned aspects of the present invention, a ultraviolet ray setting plastic material is used for coating the front surface of a cathode ray tube bulb. It is therefore possible to set the plastic material instantaneously when the plastic material is being discharged from the nozzle device to the front surface of the bulb or immediately after the discharge by applying ultraviolet ray to the coating layer. Thus, it is possible to avoid the problem that the coating layer material is allowed to flow before it is set resulting in an non-uniform thickness layer. The use of a single component material for the coating material makes the apparatus simple and the process steps easy to control. The molten plastic material discharged from the nozzle device is received by the film forming surface and allowed to flow downwards in the form of a thin film. As the result, the front surface of the cathode ray tube bulb is coated with a thin uniform film coating.

The thickness of the plastic coating on the front surface of the bulb can be maintained uniform during the setting process by alternately inclining the front surface in opposite directions or rotating the bulb about an axis which is inclined with respect to a vertical axis. In an alternative way, thin film air flows are directed from the opposite sides to the front surface of the bulb to obtain the same result.

According to another aspect of the present invention, there is provided a process for treating the front surface of the cathode ray tube for electronic devices. The process comprises steps of holding a preformed bulb of a cathode ray tube with a front surface directed upwards, supplying through a plurality of nozzles arranged in an array transparent plastic material having a viscosity of 2000 to 5000 cps, preferably 2000 to 3000 cps, to the front surface of the bulb, moving the bulb with respect to the nozzles to thereby form a coating of the plastic material throughout the front surface of the bulb. The plastic coating is then set or solidified while being leveled. The leveling step is carried out by inclining the front surface of the bulb alternately in opposite directions or rotating the bulb about an axis inclined with respect to a vertical axis. Alternatively, a thin film of air flow may be applied to the coating layer at the opposite sides thereof. Preferably, the temperature of the air in this step is 60° to 80° C. and the flow speed is 5 to 10 m/sec.

In this aspect of the process in accordance with the present invention, it is preferable to use for coating the front surface of the cathode ray tube bulb two component type plastic material which produces a setting or solidifying reaction when two components are mixed. Examples of materials suitable for use in this aspect of the invention include polyesterpolyol, polyetherpolyol and acrylpolyol as one of the components, and aliphatic diisocyanate such as hexamethylenediisocyanate as the other component. Another example of the material which can be used in the present invention is epoxy resin as one component and polyamine or polyamide resin as the other component.

The above and other objects and features of the present invention will become apparent from the following descriptions of preferred embodiments taking reference to the accompanying drawings.

DESCRIPTION OF THE PREFERRED EMBODIMENT

Figure 1:
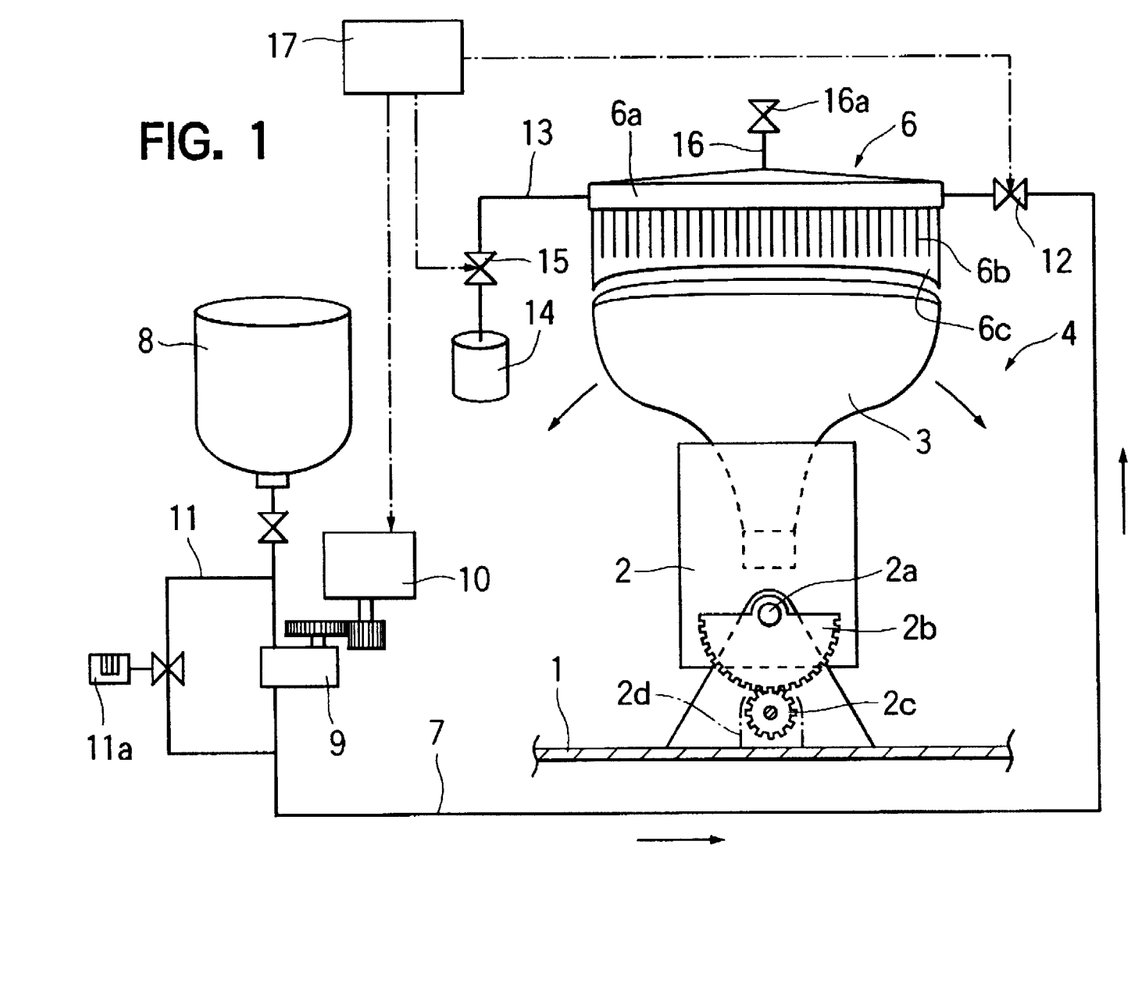
FIG. 1 is a diagrammatical front view of an apparatus for coating the front surface of a cathode ray tube bulb in accordance with one embodiment of the present invention.
Figure 2:
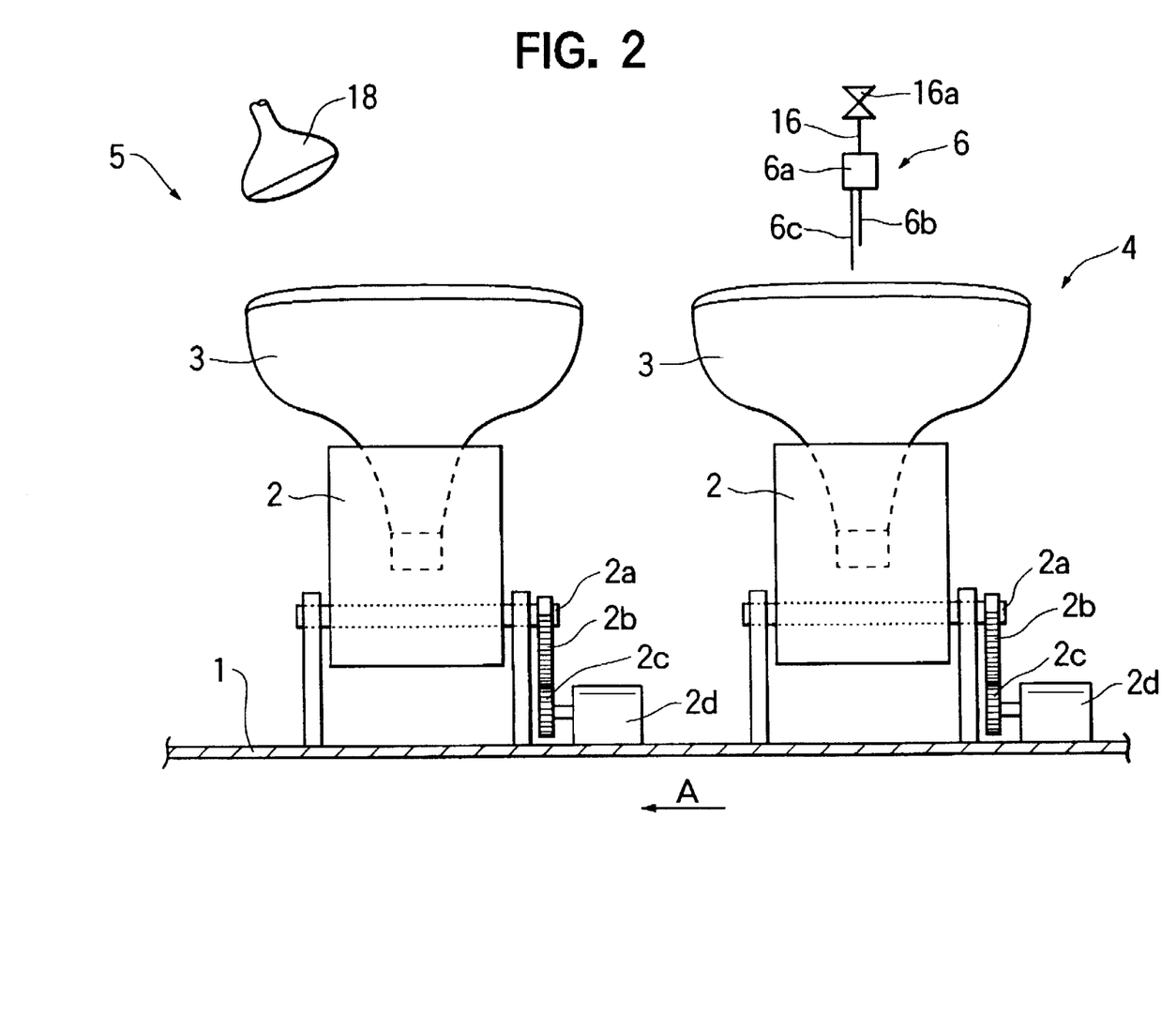
FIG. 2 is a side view of the coating apparatus shown in FIG. 1.

Embodiments of the present invention will now be described with reference to the accompanying drawings. Referring first to FIGS. 1 and 2, there is shown an apparatus comprising a conveyor 1 and a plurality of cathode ray tube bulb support mechanisms 2. The support mechanism 2 is adapted to support a cathode ray tube bulb 3 which has been formed by glass forming dies (not shown). The bulb 3 is supported by the mechanism 2 with the front surface directed upwardly. A coating station 4 and a setting station 5 are provided along the direction of movement of the conveyor 1 as shown by an arrow A.

As shown in FIG. 1, the coating station 4 includes a nozzle device 6 which is located above the conveyor 1. The nozzle device 6 comprises a hollow housing 6a of an elongated configuration and a plurality of nozzles 6b which are arranged in an array on the bottom surface of the housing 6a and extend therefrom downwardly. The housing 6a defines a closed space therein. The hollow housing 6a of the nozzle device 6 is connected through a material supply line 7 with a tank 8 which contains plastic material to be coated.

The material supply line 7 is provided at a position adjacent to the tank 8 with a gear pump 9 which is adapted to be driven by an electric motor 10. A relief passage 11 is provided in parallel with the gear pump 9 and has a relief valve 11a provided therein. The relief passage 11 is provided for preventing the pressure in the supply line 7 leading to the hollow housing 6a from increasing to an excessively high level. A shut-off valve 12 is provided in the supply line 7 between the gear pump 9 and the housing 6a at a position closer to the housing 6a.

A suction passage 13 is connected with the hollow housing 6a. The passage 13 extends downwards along a side of the housing 6a and has a lower end located below the lower ends of the nozzles 6b and opened to a drain tank 14. The suction passage 13 is provided with a shut-off valve 15. A gas relief line 16 is connected to the top portion of the housing and connected through a valve 16a with a suction device such as a suction pump (not shown). Referring to FIG. 1, it will be noted that the valve 12 in the supply line 7 and the valve 15 in the suction passage 13 are controlled by a controller 17.

According to the embodiment being discussed, the plastic material is of a ultraviolet ray setting type. Examples of materials suitable for use include urethane acrylate resin, polyester acrylate resin and epoxy resin, however, other materials may be used as long as they are of ultraviolet ray setting type. Suitable materials which are responsive to ultraviolet ray and suitable for adding to the resin as an agent for initiating resin setting include benzoinether group, halogenated acetophenone group, and benzophenon group, which may be added to the resin in an amount of 1 to 10% in weight. It is not necessary to add solvent to the plastic material and even if solvent is added the quantity may be very small. It is preferable that a heater is provided in the housing 6a so that the material contained in the housing can be maintained at a substantially constant temperature.

Figure 3:
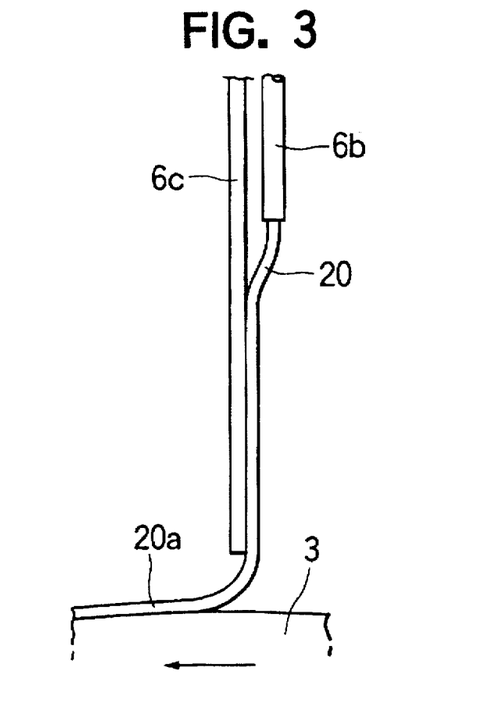
FIG. 3 is an enlarged view of a portion of the nozzle device in the apparatus shown in FIG. 1.

The nozzle device 6 has a film forming sheet 6c located behind the array of the nozzles 6b and extending downwardly from the housing 6a. The film forming sheet 6c is preferably made from a material such as silicon rubber which is not wettable to the molten plastic material. The film forming sheet 6c extends downwardly beyond the lower ends of the nozzles 6b to a position close to the front surface of the cathode ray tube bulb 3 which is supported by the support mechanism 4 on the conveyor 1. It is preferable that the lower edge of the film forming sheet 6c is contoured so that it conforms to the outside contour of the front surface of the bulb 3 as shown in FIG. 1. The film forming sheet 6c is spaced apart from the array of the nozzles 6b so that the plastic material discharged from the nozzles 6b is brought into contact with the sheet 6c and allowed to flow along the surface of the sheet 6c.

In an arrangement wherein the nozzle device 6 is moved with respect to the bulb 3, the array of the nozzles 6b is located in front of the film forming sheet 6c as seen in the direction of movement. Then, the plastic material discharged from the nozzles 6b is brought into contact with the sheet 6c as soon as it is discharged from the nozzles 6c. Thus, it is possible to locate the film forming sheet 6c with a certain spacing with respect to the array of the nozzles 6b. The embodiment which is being discussed is structured so that the bulb 3 is moved with respect to the nozzle device 6. It is therefore advisable to locate the film forming sheet 6c in close contact with the array of the nozzles 6b.

The bulb support mechanism 2 is mounted on the conveyor 1 by means of a shaft 2a for a reciprocating swinging movement as shown by arrows in FIG. 1. The shaft 2a has a sector gear 2b secured thereto which is in meshing engagement with a gear 2c provided on the conveyor 1. The gear 2c is driven by a motor 2d provided on the conveyor 1 cyclically in the opposite directions. With this structure, the bulb 3 supported by the mechanism 2 is reciprocatingly swung as shown by arrows.

In carrying out the process of the present invention with the apparatus shown in FIGS. 1 and 2, the shut-off valve 12 is first opened and the gear pump 9 is driven to supply the plastic material to the hollow housing 6a which is then filled with the plastic material. In this instance, the shut-off valve 15 is opened at an initial filling stage so as to allow plastic material to be introduced into the suction passage 13. As soon as the suction passage 13 is filled with the plastic material, the valve 15 is closed. The valve 12 is also closed when the housing 6a is filled with the plastic material. The valve 16a is then opened and the suction device such as the suction pump is operated to expel gas in the housing 6a.

The conveyor 1 is moved to bring the bulb 3 carried by the support mechanism 2 beneath the nozzle device 6. When the bulb 3 is brought to a position beneath the nozzle device 6, the conveyor 1 is temporarily stopped. The valve 12 is then opened and the gear pump 9 is operated. Since the housing 6a is filled with the plastic material, the material is immediately discharged from the nozzles 6b. The molten plastic material discharged from the nozzles 6b is brought into contact with the film forming sheet 6c and flows downwards along the surface of the sheet 6c forming a thin film. The film of the plastic material then flows over the front surface of the bulb 3. As soon as the leading end of the film of the plastic flow reaches the front surface of the bulb 3, the conveyor 1 is started to move again. Thus, the plastic material is coated over the front surface of the bulb 3 with a substantially uniform thickness.

When the overall area of the front surface of the bulb 3 is coated with the plastic material, the operation of the gear pump 9 is stopped and the valve 12 is closed. At the same time, the valve 15 in the suction passage 13 is opened. Since the housing 6a and the suction passage 13 are filled with plastic material and the lower end of the suction passage 13 is in a level lower than the lower ends of the nozzles 6b, the molten plastic material remaining in the nozzles 6b is drawn upwardly in the nozzle 6b. It is therefore possible to prevent the plastic material from dripping off the nozzle when the valve 12 is closed. When a small amount of plastic material in the nozzles 6b is sucked back into the housing 6a, the valve 15 in the suction passage 13 is closed.

The bulb 3 which is thus formed with a coating layer of plastic material is transferred to the setting station 5 by the movement of the conveyor 1. In this station 5, the bulb 3 is subjected to a radiation of ultraviolet ray which is applied by an ultraviolet device 18 to have the plastic coating thereon hardened or set. The radiation of the ultraviolet ray may not always be necessary because the plastic material may be hardened or set even under the ultraviolet ray contained in the sun light. It should therefore be noted that the term "subject the coating layer to a radiation of ultraviolet ray" in the present invention should be construed to include not only the irradiation of ultraviolet ray from a positive device such as the device 18 but also exposure to the sun light containing ultraviolet ray. The aforementioned process can provide a uniform coating layer of a thickness of about 100 to 800 μm.

In the setting station 5, the motor 2d is operated to have the bulb 3 reciprocatingly swung while the conveyor 1 is being moved. Any minute irregularities which may remain on the front surface of the bulb 3 is filled with the material in the coating layer so that it is possible to provide a bubble free, highly transparent coating layer. In this state, the material in the coating layer has to a certain extent fluidity so that it may be possible that a flow of material may be produced before it is set adversely affecting the uniformity of the thickness of the coating layer. In the embodiment of the present invention being discussed, this problem is avoided by operating the motor 2d in the setting station 5 so that the bulb 3 is slowly swung alternately in transverse directions. The speed of the swinging movement may be determined depending on the size of the bulb but may be 10 to 30 cycles per minutes. The swinging movement is found to be effective to prevent any uneven concentration of the coating material so that it is possible to have the coating layer hardened or set maintaining the uniformity of the thickness of the layer.

Figure 4:
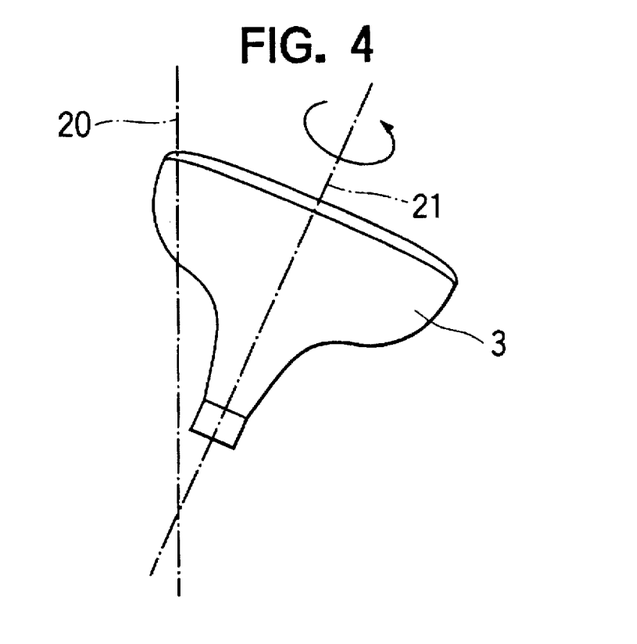
FIG. 4 is a diagrammatical view of another example of the cathode ray tube bulb support mechanism which can be used in the coating apparatus in accordance with the present invention.
Figure 5:
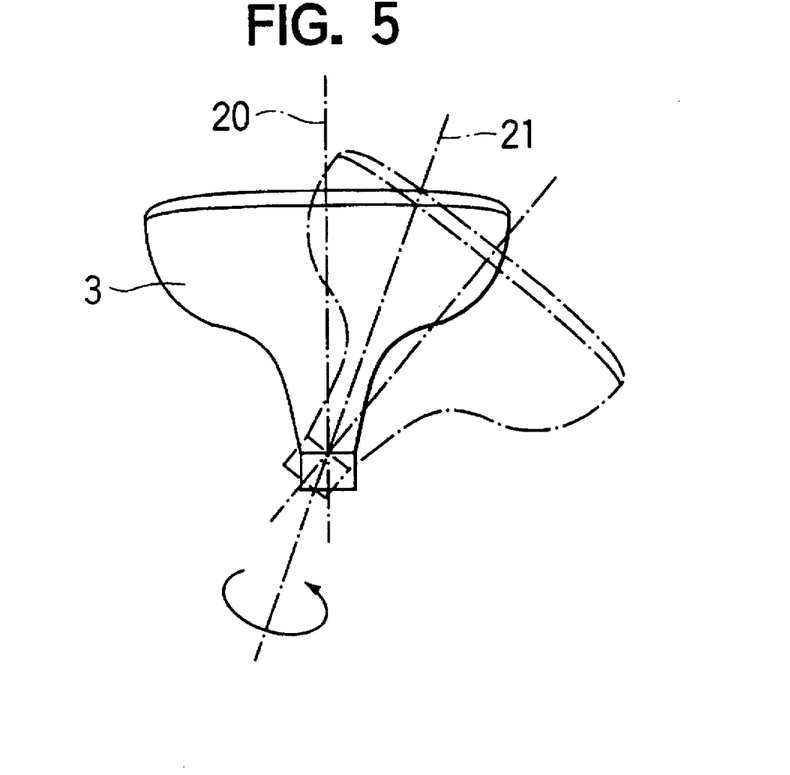
FIG. 5 is a diagrammatical view of still another example of the bulb support mechanism which can be used in the apparatus of the present invention.

FIG. 4 shows another example of the structure at the setting station 5. In this example, the bulb support mechanism 2 has a rotating axis 21 which is inclined with respect to a vertical axis 20. The bulb 3 is supported with its center axis aligned with the rotating axis 21 and rotated about the axis 21 while it is moved through the setting station 5. The speed of rotation may be determined depending on the size of the bulb 3, but may be 10 to 30 rpm. FIG. 5 shows a further example of the structure at the setting station 5. In this structure, the bulb 3 is normally supported with its center axis aligned with the vertical axis 20 but rotated about an axis 21 which is inclined with respect to the vertical axis 20. Therefore, a precession movement is produced in the bulb 3 upon its rotation. In both examples, it is possible to have the coating layer hardened while the uniformity of the thickness is still maintained.

Figure 6:
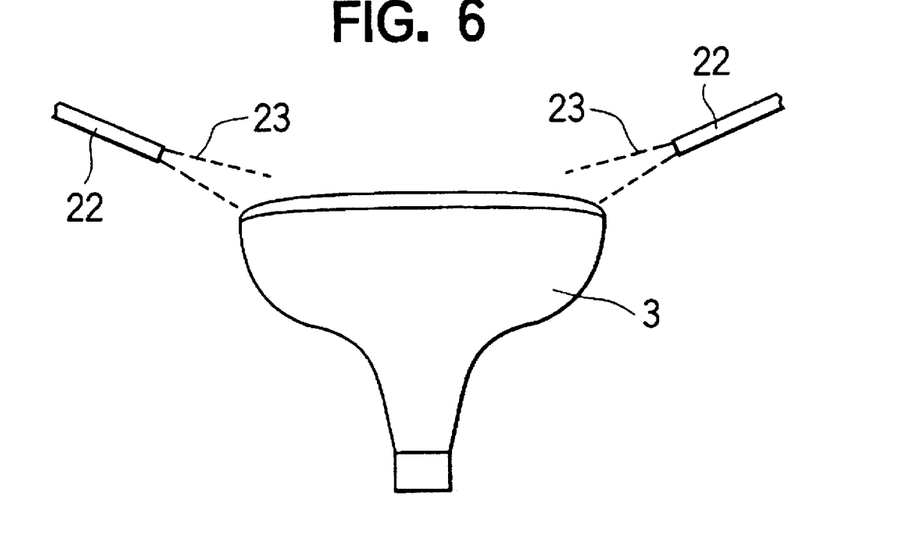
FIG. 6 is a front view showing an example of the air stream blowing device which can be used in the apparatus of the present invention.

FIG. 6 shows a still further embodiment. In this embodiment, air nozzles 22 are provided at the opposite sides of the conveyor 1 and arranged to be opposed to each other so that air stream 23 is directed to the front surface of the bulb 3. The arrangements of the air nozzles 22, the direction of the air stream 23 and the strength of the air stream 23 may be determined so that flow of the plastic material can be prevented during the setting process. As an example, the air stream may be 60° to 80° C. in temperature and 5 to 10 m/sec in speed.

Figure 7:
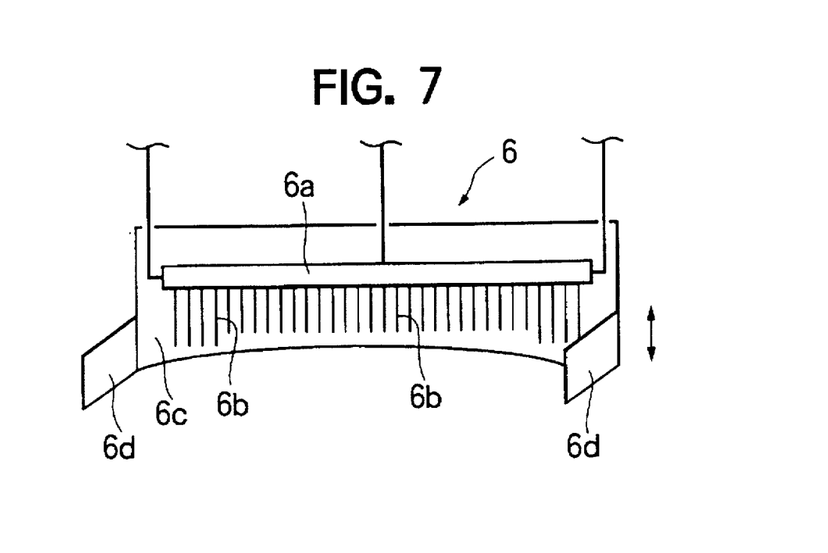
FIG. 7 is a diagrammatical perspective view of the nozzle device used in another embodiment of the present invention.
Figure 8:
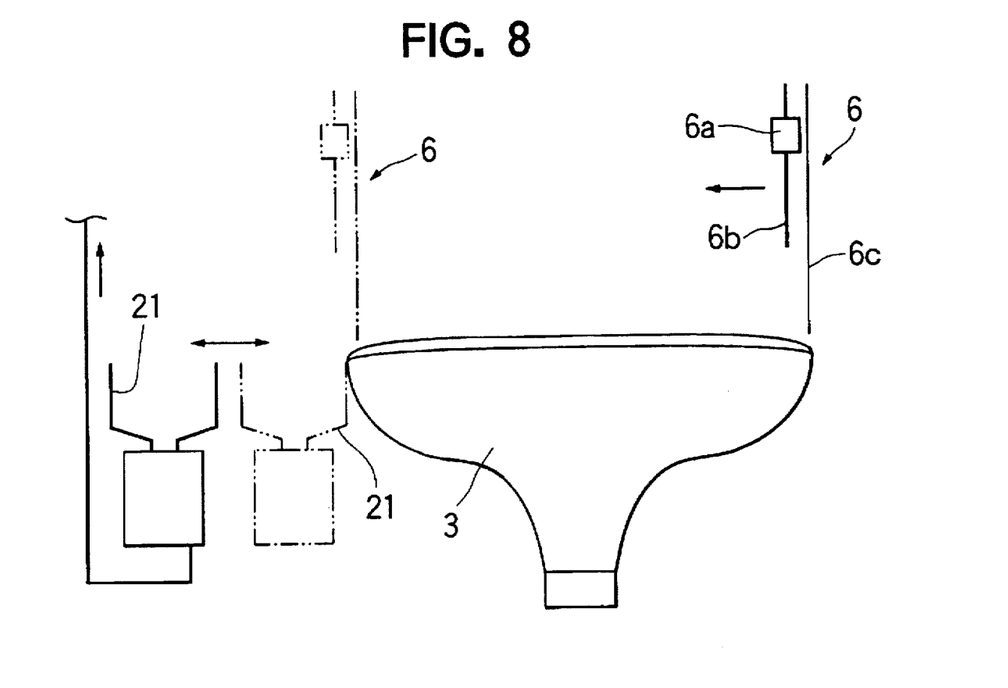
FIG. 8 is a side view showing the operation of the coating apparatus of the embodiment shown in FIG. 7.

Referring now to FIGS. 7 and 8, there is shown another embodiment of the present invention wherein corresponding parts are designated by the same reference numerals and detailed description will be omitted. In this embodiment, the nozzle device 6 has a hollow nozzle pipe 6a which is provided with a plurality of nozzles 6b arranged in an array. The nozzle pipe 6a may be formed with a nozzle slit instead of the nozzles 6b.

A film forming sheet 6c is provided behind the array of the nozzles 6b. The film forming sheet 6c has a width which is larger than the length of the array of the nozzles 6b and is formed at the opposite sides with shield plates 6d extending forwardly from the plane of the sheet 6c. In this embodiment, the nozzle device 6 is moved with respect to the bulb 3 in the direction shown by an arrow in FIG. 8 to form a coating layer of the plastic material. In this embodiment, the plastic material discharged from the nozzles 6b is brought into contact with the film forming sheet 6c to form a thin uniform film of the material which is allowed to flow downwardly.

As soon as the nozzle device 6 reaches the end of the bulb 3, the nozzle device 6 is stopped to terminate the coating process. A surplus material collecting device 21. Preferably, the nozzle device 6 is made movable in the vertical direction so that the vertical position of the nozzle device 6 can be adjusted to place the lower edge of the film forming sheet 6c 2 to 5 mm above the front surface of the bulb 3. In the present embodiment, the nozzle device 6 is moved in the direction so that the array of the nozzles 6b is in front of the film forming sheet 6c. It is therefore possible to have the plastic material from the nozzles 6b brought into contact with the sheet 6c even when the film forming sheet 6c is spaced apart from the array of the nozzles 6b by about 20 mm.

Figure 9:
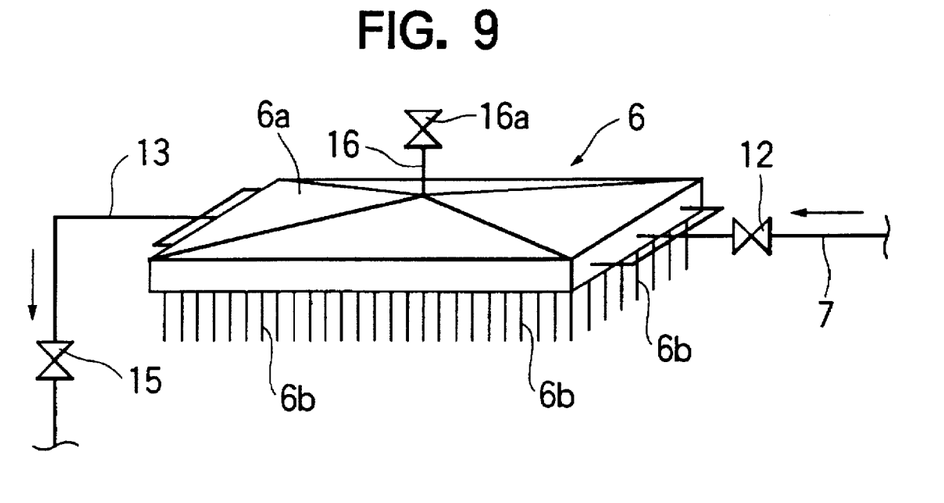
FIG. 9 is a perspective view showing a portion of the coating apparatus in accordance with another embodiment of the present invention.

FIG. 9 shows an embodiment wherein the housing 6a has a rectangular configuration. The nozzles 6b are provided in a pattern of rows and columns to cover the whole front surface area of the bulb 3. In this embodiment, the film forming sheet 6c in the previous embodiments is omitted. The plastic material discharged from the nozzles 6b forms a coating layer on the front surface of the bulb when it is discharged from the nozzles 6b. In other respects, this embodiment is the same as the previous embodiments so that detailed description will not be made further.

Figure 10:
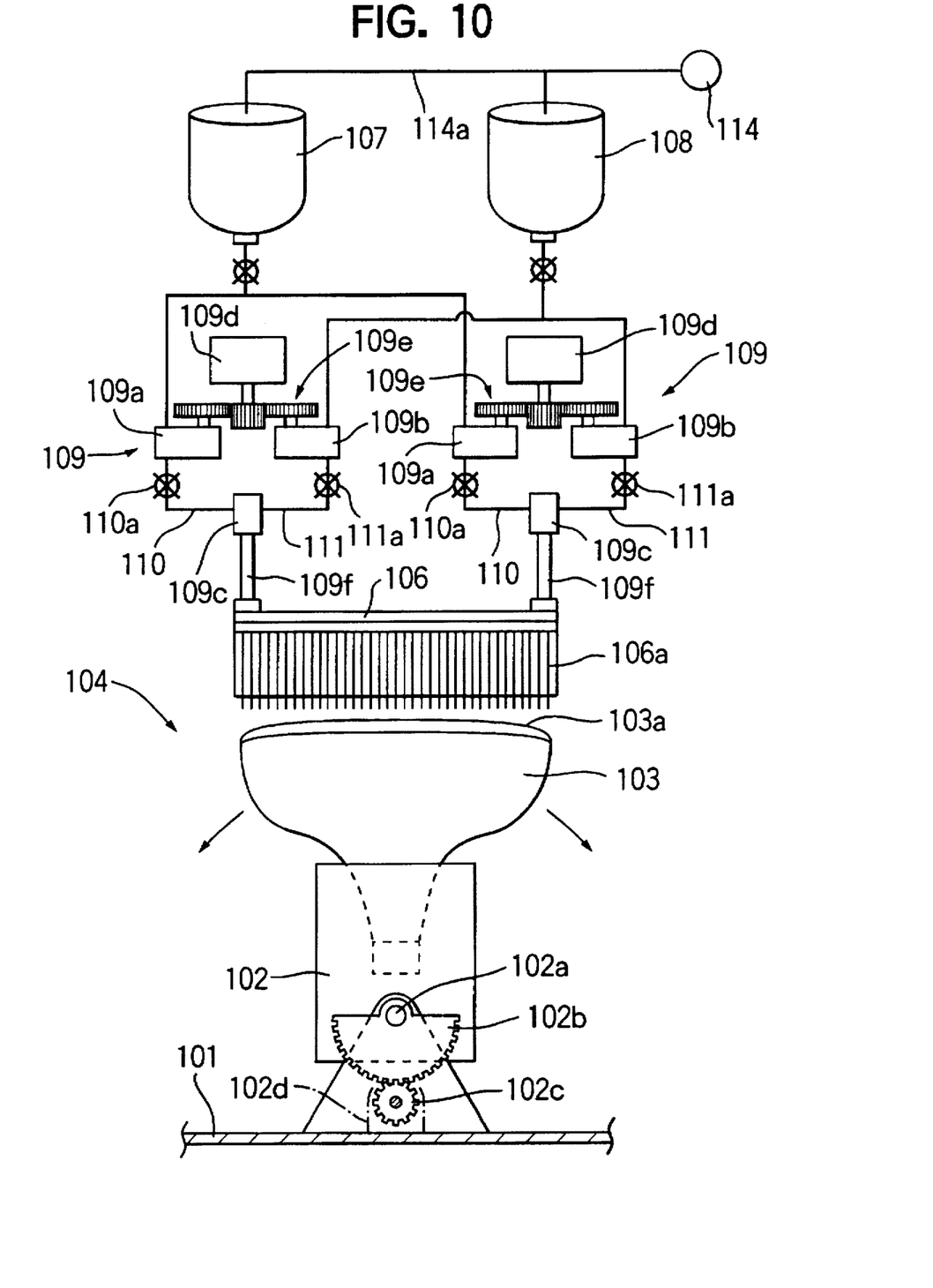
FIG. 10 is a front view of the apparatus for coating a plastic material on the front surface of a cathode ray tube bulb in accordance with a further embodiment of the present invention.
Figure 11:
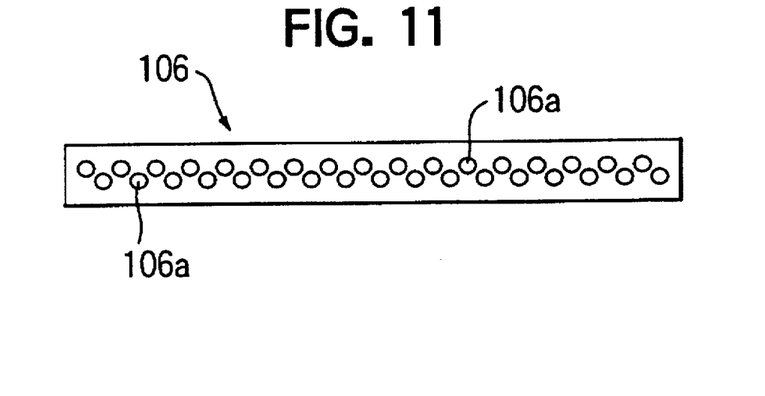
FIG. 11 is a bottom view of the nozzle device used in the apparatus shown in FIG. 10.
Figure 12A:
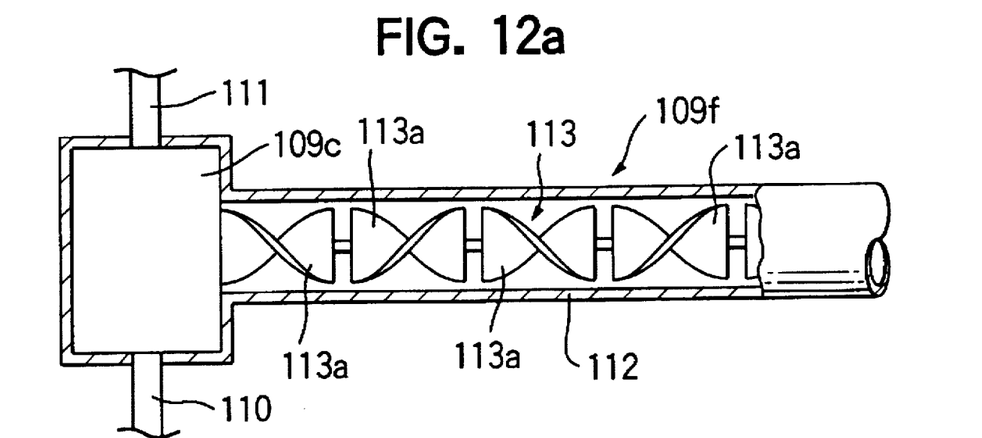
FIG. 12a is a front sectional view showing the inside structure of the mixing tube used in the apparatus shown in FIG. 10; and, FIG. 12b is a sectional view showing the inside structure of the nozzle tube.
Figure 12B:
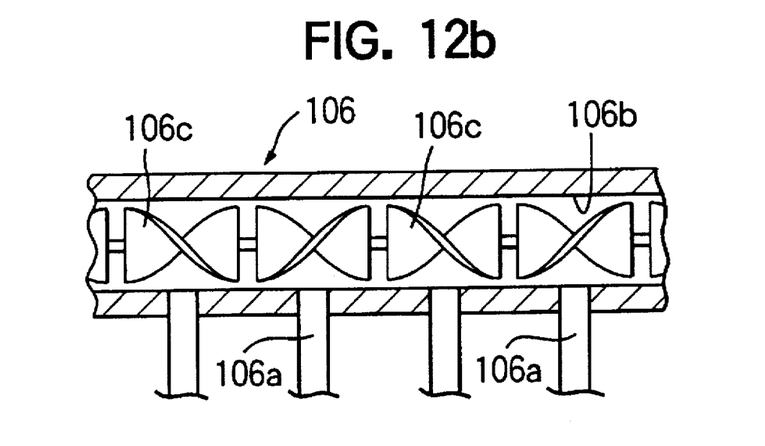

Referring now to FIGS. 10 to 12, there is shown a further embodiment of the present invention. Referring to FIG. 10, it will be noted that the apparatus shown therein includes a plurality of bulb supporting mechanism 102 provided on a conveyor 101. The supporting mechanism 102 is adapted to support a cathode ray tube bulb 103 as in the previous embodiments. Along the direction of movement A of the conveyor 101, there are provided a coating station 104 and a setting station 105.

As shown in FIG. 10, a nozzle pipe 106 is provided above the conveyor 101 in the coating station 104. The nozzle pipe 106 has a longitudinally extending passage 106b formed therein and a plurality of discharge nozzles 106a provided on the lower side thereof to extend downwardly from the pipe 106. As shown in FIG. 11, the nozzles 106a are arranged in two rows in staggered relation.

Above the nozzle pipe 106, there are provided a first material tank 107 which is adapted to contain a first component of the plastic material and a second material tank 108 which is adapted to contain a second component of the plastic material. In the present embodiment, the first component is selected from the group including polyesterpolyol, polyetherpolyol and acrylpolyol with addition of a catalyst. The second component is selected from polyamine and polyamide resins. The material tanks 107 and 108 are sealed and connected at the upper portions with a suction pipe 114a leading to a suction pump 104. The apparatus further includes a pair of mixing sections 109. Each section 109 includes a first gear pump 109a adapted for metering the first component of the material from the first material tank 107 and a second gear pump 109b adapted for metering the second component of the material from the second material tank 108. The gear pumps 109a and 109b have outlets connected through passages having valves 110a and 111a with a mixing chamber 109c.

The gear pumps 109a and 109b are arranged to be driven by a common motor 109d through a gear mechanism 109e. The capacity of the gear pumps 109a and 109b and the gear ratio of the gear mechanism 109e are preferably determined so that the mixing ratio between the first and second components becomes 1:0.77 to 1:0.84.

The mixing chamber 109c is connected with one end of a mixing tube 109f which constitutes a mixing device. The mixing tube 109f comprises an elongated tube 112 and a mixing screw 113 freely inserted into the mixing tube 112 as shown in FIG. 12a. In the embodiment which is being discussed, the mixing screw 113 is made of a hard plastic material and has a plurality of screw elements 113a which have alternately reversed spiral directions. As an example, the tube 112 has an inner diameter of 6 mm and the screw element 113a has an outer diameter which is slightly smaller than the inner diameter of the tube 112. The mixing tube 109f comprising the tube 112 and the mixing screw 113 is connected at the end opposite to the mixing chamber 109c with one end of the nozzle pipe 106. As shown in FIG. 1, a pair of such mixing tubes 109f are provided and connected with the opposite ends of the nozzle pipe 106.

The nozzle pipe 106 is formed with a passage 106b of a circular cross-section as shown in FIG. 12b, and has disposed therein a screw element 106c which is similar to the screw element 113a. As an example, the passage 106b has an inner diameter of about 6 mm and the screw element 106c has an outer diameter which is slightly smaller than the inner diameter of the passage 106b. The nozzles 106a are formed by elongated tubes of small diameter. The tube for the nozzle 106a preferably has an inner diameter of between 0.6 mm and 1.0 mm and a length of about 10 cm. The nozzle dimension is effective to maintain the material in the passage 106b in the nozzle pipe 106 at an appropriate pressure for ensuring a substantially uniform discharge of the material from the nozzles 106a.

The bulb support mechanism 102 on the conveyor 101 is mounted on the conveyor 101 for a transverse swingable movement as shown by arrows in FIG. 10. A sector gear 102b is secured to the shaft 102a and engaged with a gear 102c which is provided on the conveyor 101. The gear 102c is driven cyclically in opposite directions by a motor 102d provided on the conveyor 101. With this structure, the bulb 103 supported by the support mechanism 102 is cyclically swung in transverse direction as shown by the arrows in FIG. 10.

In operation, the suction pump 114 is first operated to draw air in the material tanks 107 and 108 to thereby degas the first and second materials. Then, the valves 110a and 111a are opened and the motor 109d is operated to mix the first and second materials. The mixture of the materials is then transmitted to the nozzle pipe 106. The mixing screw 113 includes the aforementioned screw elements 113a having alternating spiral directions, so that the first and second materials are passed in the mixing tube 109f alternately reversing the direction of swirl to be intimately mixed together. The specific structure of the mixing screw 113 effectively maintains the screw 113 stationary against rotation even though it is freely disposed in the mixing tube 109f. Even if the mixing screw 113 is slightly rotated, there will be no adverse effect in mixing. It has been found that a uniform mixing can be accomplished by a mixing tube having inner diameter of 6 mm and a length of about 600 mm. It is preferable that the flow rate is about 2 to 5 cc/sec and the operating time is about 4 to 10 seconds. In a similar manner, mixing is performed in the passage 106b of the nozzle pipe 106.

The conveyor 101 is moved while the material is being discharged from the nozzles 106a in the nozzle pipe 106. The discharged material is applied to the front surface 103a of the cathode ray tube bulb which is supported by the support mechanism 102 with the front surface 103a directed upwards. The bulb 103 which is supported by the support mechanism 102 is the one which has been formed by glass forming dies and in a condition in which the front surface is not polished. Thus, the front surface 103a has various minute irregularities.

It is preferable that the conveyor 101 is moved at a speed of 2 to 10 cm/sec. In order that the coating process is not affected by the circumferential temperature, it is preferable that the coating material is maintained at a temperature which is to a certain extent higher than the surrounding temperature. A recommendable material temperature is approximately 40° C. It has been found preferable in order to obtain a coating of uniform thickness that the material discharged from the nozzles 106a has a viscosity of 2000 to 5000 cps, more preferably, 2000 to 3000 cps. With the viscosity lower than this range, the material may produce a flow after it has been applied to the front surface 103a of the bulb 103 so that the resultant coating will have a thickness which is excessively thin at the central portion. With an excessively high viscosity, it is difficult to obtain a uniform and smooth coating. It may further be that the minute irregularities may not be sufficiently filled with the coating material so that images on the cathode ray tube may be blurred or distorted.

In the embodiments described above, it is possible to obtain a bulb 3 or 103 for a cathode ray tube which has a front surface formed with a coating layer of a transparent plastic material. The coating layer has preferably a thickness ranging 100 to 800 μm and a surface hardness between B to 5H in terms of pencil hardness.

As described above, it will be noted that the present invention provides a process and apparatus for providing a thin uniform plastic coating on the front surface of a bulb of a cathode ray tube. It should be noted that the invention has been shown and described with reference to specific embodiments, however, the invention is in no way limited to the details of the illustrated structures but changes and modifications may be made without departing from the scope of the appended claims.

We claim:

1. A process for coating the front surface of a bulb for a cathode ray tube comprising the steps of:
    holding the bulb with the front surface directed upwards;
        discharging molten transparent plastic material through a plurality of nozzles arranged in at least one array or through at least one nozzle having an elongated slit opening;
    directing the discharged plastic material directly onto a substantially vertical surface having a lower edge so that said surface forms the material into a film which flows downwardly;
    moving the bulb beneath the film forming surface transversely with respect to the lower edge of the film forming surface with the upwardly directed front surface of the bulb being close to the lower edge of the film forming surface to thereby form a coating layer of the plastic material on the front surface of the bulb; and,
    setting the plastic material of the coating layer during or after the coating step.

2. A coating process in accordance with claim 1 wherein the plastic material is ultraviolet ray setting resin.

3. A coating process in accordance with claim 2 wherein the plastic material is selected from urethaneacrylate resin, polyester resin and epoxy resin.

4. A process for coating a front surface of a bulb for a cathode ray tube comprising the steps of:

holding the bulb with the front surface directed upwards;

discharging molten, ultraviolet setting transparent plastic material through a plurality of nozzles arranged in at least one array or through at least one nozzle having an elongated slit opening onto the front surface of the bulb to thereby form a coating layer of the plastic material on the front surface of the bulb; and, levelling the coating layer so that the layer has substantially uniform thickness while applying ultraviolet ray to the coating layer to thereby set the plastic material of the coating layer.

5. A coating process in accordance with claim 4 wherein the levelling step is carried out by at least one of (i) cyclically inclining the bulb, and (ii) rotating the bulb about an axis which is inclined with respect to a vertical axis.

6. A process for coating a front surface of a bulb for a cathode ray tube comprising the steps of:

holding the bulb with the front surface directed upwards;

filling a closed space with molten, ultraviolet ray setting transparent plastic material;

discharging the plastic material from the closed space through a plurality of nozzles arranged in at least one array or through one nozzle having an elongated slit opening while supplying the plastic material to the closed space from a source of the material through a valve device;

receiving the discharged plastic material by a substantially vertical surface having a lower edge so that said surface forms the material into a film which flows downwardly;

moving the bulb beneath the film forming surface transversely with respect to the lower edge of the film forming surface with the upwardly directed front surface of the bulb being close to the lower edge of the film forming surface to thereby form a coating layer of the plastic material on the front surface of the bulb; and, terminating the supply of the material to the closed space by closing the valve device upon completion of the coating step simultaneously sucking back into the nozzle at least a portion of the material remaining in the nozzle by applying a suction to the closed space through a suction passage connected with the closed space to thereby prevent the material from dripping.

7. A coating device in accordance with claim 6 wherein the coating layer is subjected to ultraviolet ray during or after the coating step to promote setting of the plastic material of the coating layer.

8. A coating process in accordance with anyone of claims 1 to 3 and 6 to 7 wherein said film forming surface is provided by a silicon rubber.

9. A coating process in accordance with anyone of claims 1 to 3 and 6 to 7 wherein said film forming surface is provided by a sheet member.

10. A process for treating the front surface of a bulb for a cathode ray tube comprising the steps of:

holding the bulb with the front surface directed upwards;

discharging molten transparent plastic material through a plurality of nozzles arranged in at least one array or through at least one nozzle having an elongated slit opening onto the front surface of the bulb, said plastic material having a viscosity between 2000 and 5000 cps;

moving the bulb with respect to the nozzle to provide a coating layer of the plastic material on the front surface of the bulb; and, setting the plastic material in the coating layer while carrying out a levelling stage for levelling the coating layer so that the coating layer is uniform in thickness.

11. A treating process in accordance with claim 10 wherein the levelling step is carried out by at least one of (i) cyclically inclining the bulb, and (ii) rotating the bulb about an axis which is inclined with respect to a vertical axis.

12. A treating process in accordance with anyone of claims 10 and 11 wherein the plastic material is of a two component type in which setting reaction is produced when two components are mixed together, the plastic material being discharged onto the front surface of the bulb after the two components are mixed together.

13. A treating process in accordance with claim 12 wherein one of the two components is selected from polyesterpolyol, polyetherpolyol and acrylpolyol, and the other is aliphatic diiscyanate.

* * * * *